United States Patent [19]

Roddy et al.

[11] 4,156,822

[45] May 29, 1979

[54] DYNAMOELECTRIC MACHINE HAVING A NONTURNED ROTOR ASSEMBLY

[75] Inventors: Joseph T. Roddy, Ballwin; Wayne C. Springer, Florissant, both of Mo.

[73] Assignee: Emerson Electric Co., St. Louis, Mo.

[21] Appl. No.: 741,148

[22] Filed: Nov. 11, 1976

[51] Int. Cl.² .............................................. H02K 1/00
[52] U.S. Cl. ..................................... 310/216; 310/42; 310/259
[58] Field of Search ............... 310/216, 217, 258, 259, 310/254, 66, 42

[56] References Cited

U.S. PATENT DOCUMENTS

| | | | |
|---|---|---|---|
| 1,286,013 | 11/1918 | Jeannin | 310/216 |
| 3,202,851 | 8/1965 | Zimmerle et al. | 310/259 |
| 3,840,983 | 10/1974 | Ryff | 310/217 X |
| 3,842,300 | 10/1974 | Daykin et al. | 310/216 |
| 3,845,340 | 10/1974 | Brooks et al. | 310/217 |

*Primary Examiner*—Mark O. Budd
*Attorney, Agent, or Firm*—Polster, Polster and Lucchesi

[57] ABSTRACT

A stator core lamination and a rotor core lamination for a dynamoelectric machine are formed from the same lamination blank. The stator core lamination has a series of operations performed on it, preferably during the punch press manufacture of the laminations. Those operations enable a stator core, formed from the stator laminations, to receive a rotor core, formed from the rotor laminations, without any machining steps being performed on either core in order to accomplish the reception. The stator lamination includes a yoke section having a central rotor receiving bore opening formed in it. A plurality of slots extend radially outwardly from the bore opening. That area of the lamination between adjacent slots define a plurality of stator teeth. The teeth include a root section attached to the yoke and a stem having an inboard face delimiting the bore opening. The yoke and teeth initially lie in and define a first physical plane area. The yoke and the teeth are bent at angles from and toward the first plane area so that portions of the yoke teeth lie in planes other than the first plane. Consequently, the inboard face of the teeth prescribe a bore opening having a larger diameter than the diameter when the teeth and yoke remain essentially in the same or first physical plane.

7 Claims, 10 Drawing Figures

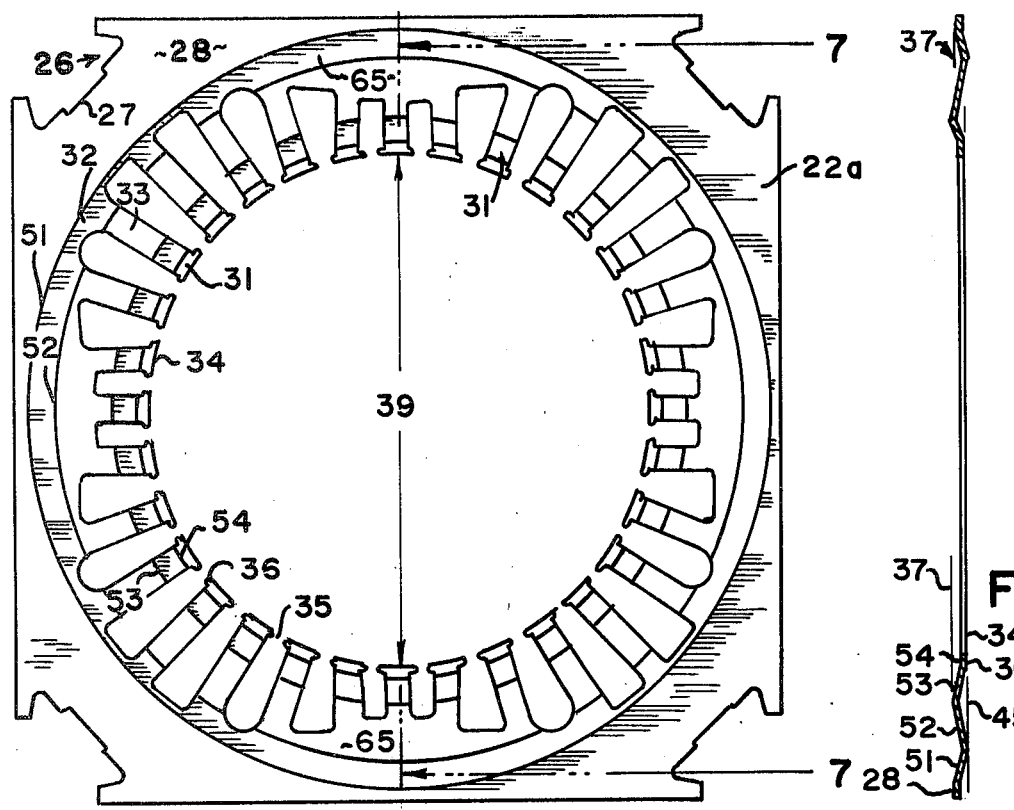
FIG. 6.
FIG. 7.
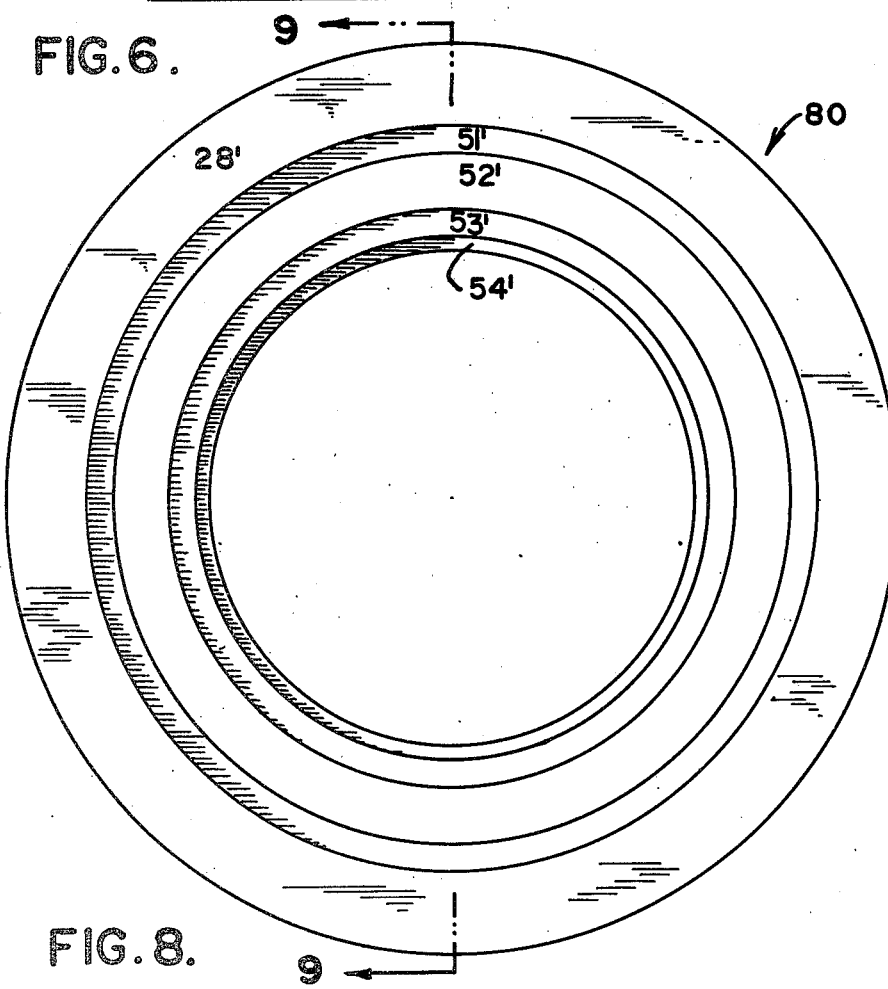
FIG. 8.
FIG. 9.

DYNAMOELECTRIC MACHINE HAVING A NONTURNED ROTOR ASSEMBLY

BACKGROUND OF THE INVENTION

This invention relates to dynamoelectric machines, and in particular, to a stator assembly and method of construction therefor. While the invention is described with particular reference to induction motors, those skilled in the art will recognize the wider applicability of the inventive principles disclosed hereinafter.

Conventionally, a dynamoelectric machine, of the induction motor type, for example, includes a stator assembly and a rotor assembly, each of which are constructed from a plurality of individual laminations formed from a suitable magnetic material. The lamination material commonly is slit to a predetermined width and fed through a punch press having a progressive die which punches or constructs the lamination silhouette in a series of steps. The rotor lamination is formed from the same lamination blank as the stator lamination. That is, in the progressive construction of the laminations, the stator lamination final design commonly has a yoke section having a central bore opening formed in it. A plurality of winding receiving slots extend radially outwardly from the central bore opening. The material removed from the material blank to form the central bore opening becomes the rotor lamination.

After the laminations are separated from the material blank from which they are formed, the individual laminations are segregated from one another and used to construct a stator core and a rotor core. Both the stator and rotor cores are formed from a plurality of the individual laminations, those laminations being secured to one another by any convenient method. In the case of the stator core, welding, cleating, adhesive bond or combination of these methods are commonly used expedients for core construction. Rotor cores for induction motors conventionally are of a squirrel cage design. The rotor laminations have a plurality of closed slots formed in them. Aluminum is cast in the rotor core slots to form the rotor conductor bars. The injection of the aluminum in the slots and the shorting of the rotor bars along the end faces of the rotor core hold the rotor core in the desired configuration.

The stator core has a suitable insulation positioned in the winding receiving slots, and the motor windings are placed in those slots. Thereafter, various finishing processes, not concerned with the present invention, are performed on the stator assembly. After construction of the stator and rotor assemblies, those assemblies are joined together to form a conventional induction motor. In the case of most induction motors, this is accomplished by supporting the rotor and its associated shaft along a pair of end shields, and placing the rotor within the bore opening of the stator assembly. It has been conventional to machine the outer diameter of the rotor assembly in order to permit its insertion within the bore opening and to provide the necessary air gap between the rotor and stator assemblies for proper motor operation. Machining is a relatively expensive and time consuming step in the motor construction process and a significant cost reduction is achieved if the machining operation can be eliminated.

Our invention eliminates the machining operation as a manufacturing step in motor construction. We accomplish this result by constructing a stator lamination having a yoke with a central bore opening formed in it. A plurality of slots extend radially outwardly from the bore opening. The area of the lamination between adjacent slots define a plurality of stator teeth. The lamination yoke lies in and defines a first plane area. Air gap between the stator and rotor in their final assembly is provided by bending the teeth of the individual stator laminations from the plane of the lamination yoke so that the final diameter of the central bore opening is larger than the opening provided when the teeth are essentially in the same plane as the yoke. Stator laminations often have varying depth winding receiving slots formed in them. As later described in detail, bending of certain ones of the teeth often also entails bending of the lamination yoke.

One of the objects of this invention is to provide a dynamoelectric machine which does not require a machining operation to provide air gap between the stator and rotor assemblies of the machine.

Another object is to provide a low cost dynamoelectric machine construction.

Yet another object is to provide a lamination for a dynamoelectric machine in which the teeth and portions of the yoke of the stator lamination are bent from a first plane initially containing both the teeth and the lamination yoke so that the bore opening diameter defined by the inboard surfaces of the teeth is larger than the bore opening diameter when the teeth and lamination yoke lie entirely in the first plane.

Other objects of this invention will be apparent to those skilled in the art in light of the following description and accompanying drawings.

SUMMARY OF THE INVENTION

In accordance with this invention, generally stated, a stator assembly and a rotor assembly are provided with adequate air gap for dynamoelectric machine operation without requiring a machining operation on either the stator assembly internal diameter or the rotor assembly external diameter, even though the stator lamination and rotor lamination used for the respective assemblies are formed from the same material blank. The stator assembly includes a core constructed from a plurality of individual laminations. The laminations each include a yoke having a central bore opening formed in it. A plurality of radial slots extend outwardly from the bore. The area between successive slots delimit a plurality of stator teeth. The teeth have root sections integrally formed with the yoke and stems having an inboard face defining the bore opening. Portions of the yoke and the teeth are bent from and toward the initial plane of the yoke and teeth so that the diameter of the bore opening after bending is greater than the bore opening available when the yoke and teeth remain essentially in the initial plane.

BRIEF DESCRIPTION OF THE DRAWINGS

In the drawings.

FIG. 6 is a top plan view of a second illustrative embodiment of lamination employing our invention;

FIG. 7 is a sectional view taken along the line 7—7 of FIG. 6;

FIG. 8 is a top plan view of a forming tool for constructing the lamination shown in FIG. 6;

FIG. 9 is a sectional view taken along the line 9—9 of FIG. 8; and

DESCRIPTION OF THE PREFERRED EMBODIMENT

Figure 1:
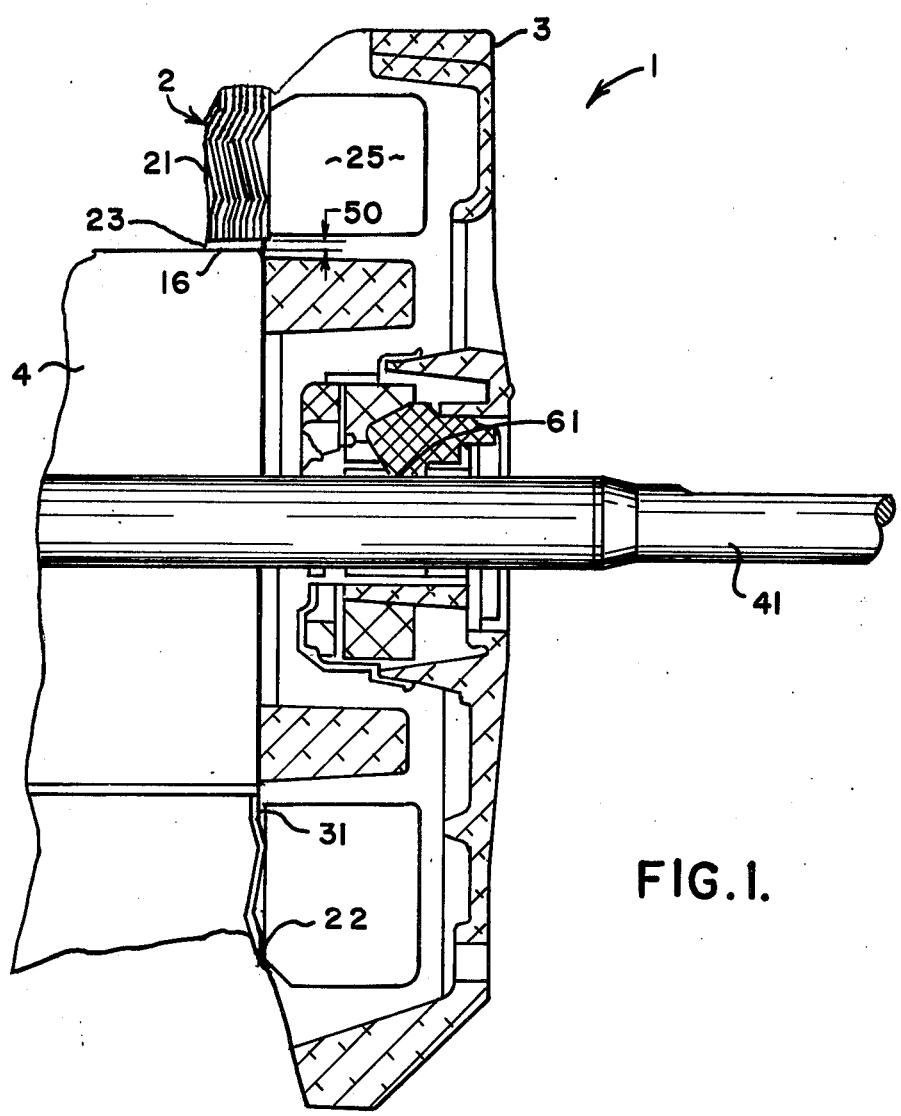
FIG. 1 is a sectional view, partly broken away, of a dynamoelectric machine employing one illustrative embodiment of our invention.

Referring now to FIG. 1, reference numeral 1 indicates a dynamoelectric machine of the induction motor type including a stator assembly 2 and a rotor assembly 4.

The stator assembly 2 includes a stator core 21 made up of a multiplicity of identical laminations 22. The laminations are secured face to face in axial alignment to define an axial rotor bore 23 surrounded by a plurality of stator teeth 31, around which coils 25 are wound. The laminations 22 are described in greater detail hereinafter.

The rotor assembly 4 includes a motor shaft 41. The rotor assembly 4, and in particular the shaft 41, is rotatably supported along a pair of end shields 3, only one of which is shown in the drawings, the non-illustrated end shield being similar to that shown. The shaft 41 extends through the end shield pair 3 on at least one end of the motor 1. The shaft 41 is journalled in bearings 61 mounted in each of the end shields 3.

Figure 2:
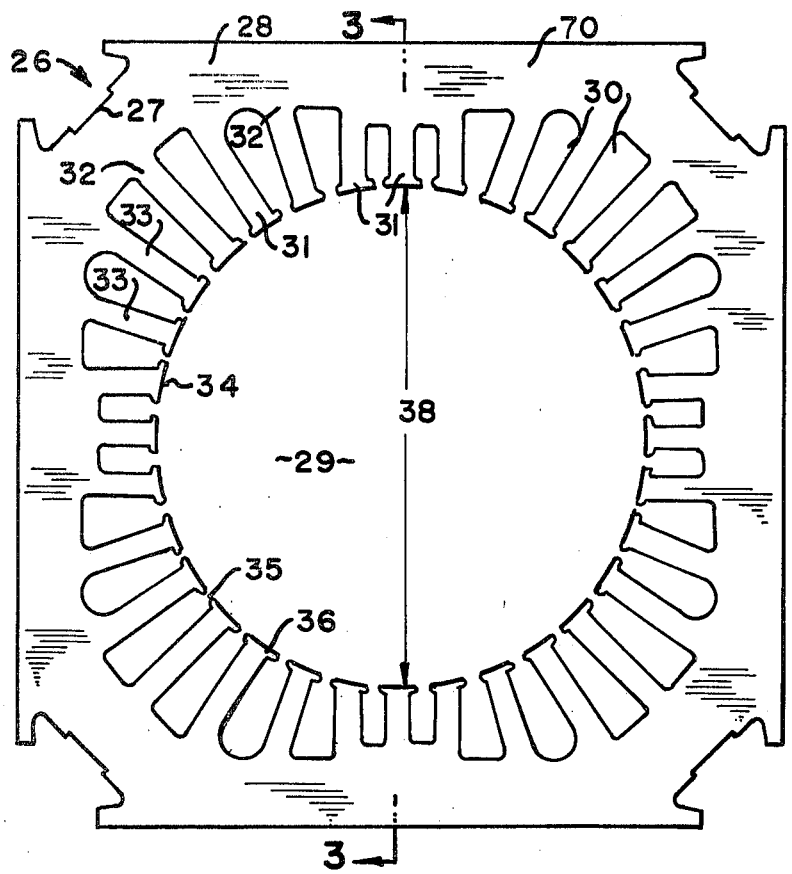
FIG. 2 is a plan view of a prior art lamination compatible with the dynamoelectric machine of FIG. 1.
Figure 3:
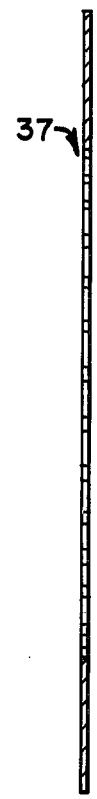
FIG. 3 is a sectional view taken along the line 3—3 of FIG. 2.

In the prior art, the stator core 21 of the stator assembly 2 was constructed from a plurality of essentially planer laminations 70, best observed in FIGS. 2 and 3. The laminations 70 generally are rectangular in plan, and each of the laminations has a number of channels 26 formed in it. The channels 26 conventionally are positioned along the far corners of the lamination 70. The channels 26, in turn, have a cleat notch 27 formed in them. The cleat notch 27 receives a cleat for clamping the individual laminations 70 in their aligned relationship to form the stator core. The channels 26 are formed in a yoke 28 of the lamination. Yoke 28 also has a central bore opening 29 formed in it. A plurality of slots 30 extend radially outwardly from and communicate with the bore opening 29. The area of the yoke 28 between successive ones of the slots 30 delimits a plurality of stator teeth 31. The stator teeth 31 have a root 32 integrally formed with the yoke 28, and a stem 33 which extends radially inwardly toward the bore opening 29. An inboard face 34 of the stem 33 surrounds the bore opening 29 for the lamination 70. The bore opening 29 communicates with the slots 30 along a slot opening 35 between adjacent tips 36 of the teeth 31. The yoke and teeth, of the lamination 70, all lie in a plane 37, as best seen in FIG. 3. The bore opening 29 of the laminations 70 has an internal diameter 38. As indicated, in order to achieve a required air gap 50 between the stator assembly 2 and the rotor assembly 4, the rotor assembly 4 conventionally is machined along an outer surface 16 until it is substantially smaller than the diameter 38 of the bore opening 29.

Figure 4:
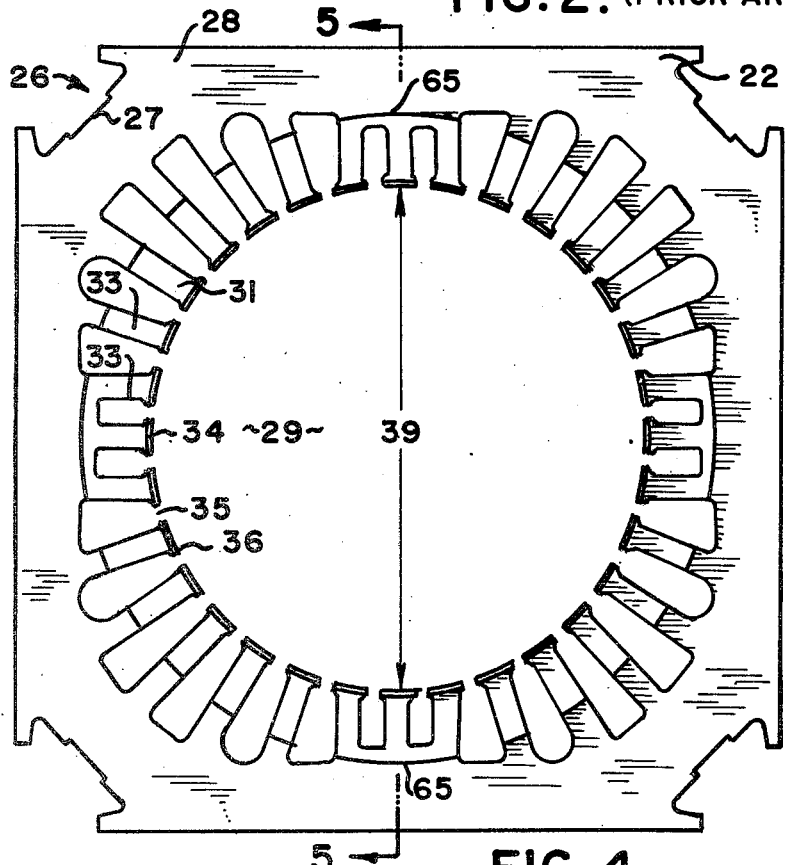
FIG. 4 is a top plan view of a first illustrative embodiment of a lamination constructed in accordance with the principles of our invention.
Figure 5:
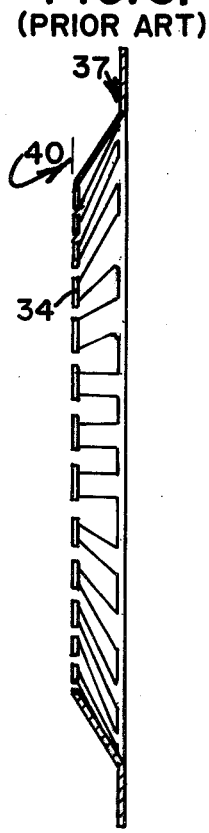
FIG. 5 is a sectional view taken along the line 5—5 of FIG. 4.

We have found that the machining operation may be eliminated by a relatively simple manufacturing step in the construction of the lamination 22, one illustrative example of which is shown in FIGS. 4 and 5. Like reference numerals are utilized for like parts, where appropriate. As there illustrated, the yoke 28 of the lamination 22 initially lies in the first plane 37. However, portions of the yoke 28 and the teeth 31 of the lamination 22 are bent from the plane 37 so that the bore defining faces 34 of the teeth 31 define a diameter 39 for the bore opening 29. The diameter 39 necessarily is larger than the diameter 38 because the faces 34 of the laminations 22 lie in a plane 40 offset from the plane 37. The degree of bend required is a determination made so that the diameter 39 of the bore opening 29 will permit reception of the rotor assembly 4 without the necessity of machining either the laminations 22 along the bore opening, or the outer diameter of the rotor assembly 4 along the surface 16. The teeth 31 generally are bent along the stem 33 portion of the teeth. However, as observable at 65, lamination design may require the bending operation to occur along at least a part of the yoke 28. In any event, bending is accomplished by applying sufficient force to the laminations, either individually or in stacked relationship, through a suitable fixture, until the faces 34 of the teeth 31 all lie in the plane 40.

While the lamination 22 shown in FIG. 4 works for its intended purpose, use of the lamination 22 results in a stator core 21 which has one concave face and one convex face. The aesthetic result is undesirable from a marketability standpoint. The diameter 39, however, also may be obtained by performing a series of bends along the length of the stem 33 of the stator teeth 31 until the required diameter is obtained. Preferably, the tooth tip 36 also is bent back to a plane parallel to the initial plane 37.

As observable in FIGS. 6 and 7, where like numerals are used where appropriate, at least a portion of the yoke 28 of a lamination 22a again is contained in the first plane 37. A first bend 51 is made in the lamination 22a so that the teeth 31 are bent from the initial plane 37. Again, lamination design may be such that a part of the yoke 28 also is bent. Yoke bending occurs because the bend 51 is made at the root 32 of a tooth 31 having the longest stem 33. Consequently, a portion of the yoke 28, as for example, at 65, also is bent. Thereafter, a bend 52 is made back toward initial plane 37 which may extend the stem 33 through that plane. Then, a bend 53 in the stem 33 directs the teeth 31 in a reverse direction. Finally, the tooth tip 36 is bent at 54 into a plane 45 which is parallel to the plane 37. In the embodiment illustrated, plane 45 is offset from the plane 37. Those skilled in the art will recognize that the face 34 of the teeth may be returned to the initial plane 37, if desired. The embodiment of FIGS. 6 and 7 is advantageous in that the offset from the initial plane 37, even when the face 34 is offset in the plane 45, is relatively small as compared to the offset encountered with the lamination 22 of FIG. 2. Consequently, after insertion of the windings 25 in the slots 30, the motor 1 gives the appearance of being constructed conventionally, unless the stator assembly 2 is examined closely.

FIG. 8 shows a fixture 80 in which a lamination 70 may be converted to the lamination 22a merely by applying the proper force on the lamination and the fixture. In FIG. 9, the areas of the fixture 80 giving the lamination 22a its distinctive bends are indicated by prime numerals.

Figure 10:
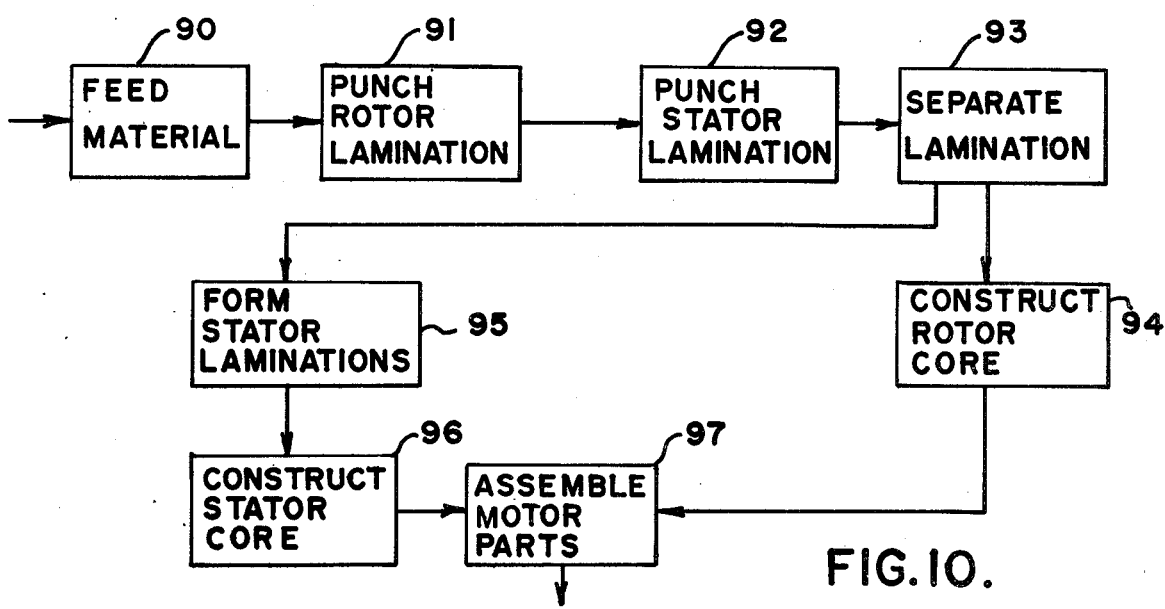
FIG. 10 is a block diagrammatic view illustrating a preferred method for constructing the motor shown in FIG. 1.

Formation of the lamination 22a may be accomplished in a relatively simple manner. Lamination stock material, which conventionally is slit from larger rolls into a predetermined width of material, is fed into a suitable punch press in a step 90, shown in FIG. 10. The punch press, conventionally utilizing a progressive die, proceeds to form the lamination silhouettes for the rotor lamination and the stator laminations in steps 91 and 92. After the particular silhouettes of the laminations are formed, the laminations are separated from the material blanks by final cut out of the bore opening 29 in a step 93 and the rotor laminations are physically removed from the punch press. Thereafter, the rotor core is constructed in accordance with conventional techniques in a step 94. The stator laminations, however, preferably continue in the punch press, where they are formed into the desired configuration in a step 95. After forming, the stator laminations are removed from the punch press and are used to construct the stator cores in a step 96. Stator core construction also is accomplished in accordance with conventional techniques. Thereafter, the stator assembly and rotor assembly motor parts are assembled into the finished product in a step 97.

Numerous variations, within the scope of the appended claims, will be apparent to those skilled in the art in light of the foregoing description and accompanying drawings. Thus, the design silhouette, slot configuration and physical dimensions of the laminations may vary in other embodiments of this invention. While preferably the laminations are formed in conjunction with the punch press operation, formation of the lamination teeth may be accomplished at a separate station. Likewise, while a predetermined number of bends were described in conjunction with the laminations 22 and 22a, the bend number may vary in other embodiments of the invention. These variations are merely illustrative.

Having thus described the invention, what is claimed and desired to be secured by Letters Patent is:

1. A motor assembly, comprising:

A stator core assembly, said stator core assembly being constructed from a plurality of individual laminations, each of said laminations having a yoke, a central bore opening, and a plurality of teeth extending outwardly from said bore opening to said yoke, said teeth plurality defining winding receiving slots, and windings in said slots, said yoke initially lying in a first plane, said teeth having root sections, stem sections, and tips, the stem sections having predetermined lengths, said laminations being bent at the root of the tooth having the longest predetermined length stem section such that all of said teeth are bent from said first plane area so as to define a diameter for said central bore opening larger than the diameter of said central bore opening when said teeth lie in said first plane area, said teeth being bent along said tips so that a face of said tips lies in a second plane parallel to the first plane area; and a rotor assembly including a laminated core of magnetic material, said rotor assembly having an outer diameter, the outer diameter of said rotor core being sized for reception in the central bore opening of said stator assembly when said laminations are bent along the root of said teeth.

2. The motor assembly of claim 1 wherein the second plane containing the face of said tips is offset from said first plane, but parallel thereto.

3. The motor assembly of claim 2 wherein each of said teeth have a plurality of bends formed in them along their stem section, between the root section and tip.

4. In a dynamoelectric machine including a stator assembly, the improvement which comprises laminations for said stator assembly wherein each of said laminations includes a yoke, said yoke having a central bore opening in it, and a plurality of slots extending radially outwardly from said central bore opening, the area of said yoke between successive ones of said slots defining a plurality of lamination teeth, each of said teeth having a root section attached to said yoke and a stem section extending to said bore opening, said stem sections having predetermined lengths terminating in tips, the lamination being bent at the root of the tooth having the longest predetermined stem section, said teeth being bent from said first plane so as to define a diameter for said central bore opening larger than the diameter of said central bore opening when said teeth lie in said first plane, said teeth being bent along said tips so that a face of said tips is in a plane parallel to but offset from the plane of said yoke.

5. The improvement of claim 4 wherein each of said teeth have a plurality of bends formed in them along their stem section, between the root section and tip.

6. The improvement of claim 5 wherein said plurality of bends are formed alternately with respect to one another about a predetermined radial axis of said teeth.

7. A dynamoelectric machine including a stator assembly, the improvement which comprises a plurality of laminations for constructing said stator assembly wherein each of said laminations includes a yoke, said yoke having a central bore opening in it, and a plurality of slots extending radially outwardly from said radial bore opening, the area of said yoke between successive ones of said slots defining a plurality of lamination teeth, said teeth having a root section attached to said yoke, a stem portion extending to said bore opening, and a tip at said bore opening including a face defining said bore opening, at least a portion of said yoke existing in a first plane, at least a portion of said teeth existing in a second plane, the faces of said tips defining a central bore opening having a diameter larger than the diameter of the central bore opening when said yoke and said teeth exist essentially in said first plane, the stems of said teeth having varying lengths, said teeth being bent from said yoke at the distance approximately equal to the greatest stem length, said teeth being bent along said tips so that the face of said tips is in a second plane parallel to but offset from said first plane.

* * * * *